(12) United States Patent
Pugh et al.

(10) Patent No.: US 8,906,088 B2
(45) Date of Patent: Dec. 9, 2014

(54) VARIABLE FOCUS OPHTHALMIC DEVICE INCLUDING LIQUID CRYSTAL ELEMENTS

(71) Applicant: Johnson & Johnson Vision Care, Inc., Jacksonville, FL (US)

(72) Inventors: Randall B. Pugh, Jacksonville, FL (US); Daniel B. Otts, Fruit Cove, FL (US); Frederick A. Flitsch, West Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 35 days.

(21) Appl. No.: 13/724,459

(22) Filed: Dec. 21, 2012

(65) Prior Publication Data

US 2013/0166025 A1    Jun. 27, 2013

Related U.S. Application Data

(60) Provisional application No. 61/579,695, filed on Dec. 23, 2011.

(51) Int. Cl.
*A61F 2/16*         (2006.01)

(52) U.S. Cl.
USPC ........................................................ 623/6.22

(58) Field of Classification Search
USPC ................... 623/4.1, 5.11, 6.11, 6.22, 6.37; 351/159–160 R
See application file for complete search history.

(56) References Cited

U.S. PATENT DOCUMENTS

| | | | |
|---|---|---|---|
| 6,364,482 B1 * | 4/2002 | Roffman et al. | ......... 351/159.12 |
| 2006/0164593 A1 | 7/2006 | Li et al. | |
| 2008/0208335 A1 * | 8/2008 | Blum et al. | .................. 623/6.22 |
| 2010/0103369 A1 | 4/2010 | Pugh et al. | |

FOREIGN PATENT DOCUMENTS

| | | |
|---|---|---|
| WO | WO 01/02895 A1 | 1/2001 |
| WO | WO 02/057836 A1 | 7/2002 |
| WO | WO 2004/015460 A2 | 2/2004 |
| WO | WO 2008/091859 A1 | 7/2008 |

OTHER PUBLICATIONS

PCT International Search Report dated Apr. 10, 2013 for PCT Intl. Appln. No. PCT/US2012/071263.

* cited by examiner

*Primary Examiner* — William Matthews (57) ABSTRACT

This invention discloses methods and apparatus for providing a Variable Optic Insert into an Ophthalmic Lens. An energy source is capable of powering the Variable Optic Insert included within the Ophthalmic Lens. In some embodiments, an Ophthalmic Lens is cast-molded from a silicone hydrogel. The various Ophthalmic Lens entities may include electroactive Liquid Crystal layers to electrically control refractive characteristics.

21 Claims, 9 Drawing Sheets

VARIABLE FOCUS OPHTHALMIC DEVICE INCLUDING LIQUID CRYSTAL ELEMENTS

RELATED APPLICATIONS

This application claims priority to the U.S. Provisional Application No. 61/579,695, filed Dec. 23, 2011, the contents of which are relied upon and incorporated herein.

FIELD OF USE

This invention describes an Ophthalmic Lens Device with a Variable Optic capability and, more specifically, in some embodiments, the fabrication of an Ophthalmic Lens with a Variable Optic Insert utilizing Liquid Crystal elements.

BACKGROUND

Traditionally an Ophthalmic Lens, such as a Contact Lens or an Intraocular Lens provided a predetermined optical quality. A Contact Lens, for example, can provide one or more of the following: vision correcting functionality; cosmetic enhancement; and therapeutic effects, but only a set of vision correction functions. Each function is provided by a physical characteristic of the lens. Basically, a design incorporating a refractive quality into a lens provides vision corrective functionality. A pigment incorporated into the lens can provide a cosmetic enhancement. An active agent incorporated into a lens can provide a therapeutic functionality.

To date optical quality in an Ophthalmic Lens has been designed into the physical characteristic of the lens. Generally, an optical design has been determined and then imparted into the lens during fabrication of the lens, such as, for example through cast molding, or lathing. The optical qualities of the lens have remained static once the lens has been formed. However, wearers may at times find it beneficial to have more than one focal power available to them in order to provide sight accommodation. Unlike spectacle wearers, who can change spectacles to change an optical correction, contact wearers or those with Intraocular Lenses have not been able to change the optical characteristics of their vision correction without significant effort.

SUMMARY

Accordingly, the present invention includes innovations relating to a Variable Optic Insert with Liquid Crystal elements that may be energized and incorporated into an ophthalmic device, which is capable of changing the optical quality of the lens. Examples of such ophthalmic devices may include a Contact Lens or an Intraocular Lens. In addition, methods and apparatus for forming an Ophthalmic Lens with a Variable Optic Insert with Liquid Crystal elements are presented. Some embodiments may also include a cast-molded silicone hydrogel contact lens with a rigid or formable Energized Insert, which additionally includes a Variable Optic portion, wherein the Insert is included within the Ophthalmic Lens in a biocompatible fashion.

The present invention therefore includes disclosure of an Ophthalmic Lens with a Variable Optic Insert, apparatus for forming an Ophthalmic Lens with a Variable Optic Insert, and methods for manufacturing the same. An Energy Source may be deposited onto a Variable Optic Insert and the Insert may be placed in proximity to one, or both of, a first Mold part and a second Mold part. A Reactive Monomer Mixture is placed between the first Mold part and the second Mold part. The first Mold part is positioned proximate to the second Mold part thereby forming a lens cavity with the Energized Media Insert and at least some of the Reactive Monomer Mixture in the lens cavity; the Reactive Monomer Mixture is exposed to actinic radiation to form an Ophthalmic Lens. Lenses are formed via the control of actinic radiation to which the Reactive Monomer Mixture is exposed. In some embodiments, an Ophthalmic Lens skirt or an Insert-encapsulating layer may be comprised of standard hydrogel Ophthalmic Lens formulations. Exemplary materials with characteristics that may provide an acceptable match to numerous Insert materials may include, for example, the Narafilcon family (including Narafilcon A and Narafilcon B), and the Etafilcon family (including Etafilcon A).

The methods of forming the Variable Optic Insert with Liquid Crystal elements and the resulting Inserts are important aspects of various embodiments. In some embodiments, the Liquid Crystal may be located between two Alignment Layers, which may set the Resting Orientation for the Liquid Crystal. Those two Alignment Layers may be in Electrical Communication with an Energy Source through electrodes deposited on substrate layers that contain the Variable Optic portion. The electrodes may be energized through an intermediate interconnect to an Energy Source or directly through components embedded in the Insert.

The energization of the Alignment Layers may cause a shift in the Liquid Crystal from a Resting Orientation to an Energized Orientation. In embodiments that operate with two levels of energization, on or off, the Liquid Crystal may only have one Energized Orientation. In other alternative embodiments, where energization occurs along a scale of Energy levels, the Liquid Crystal may have multiple Energized Orientations.

The resulting alignment and orientation of the molecules may affect light that passes through the Liquid Crystal layer thereby causing the variation in the Variable Optic Insert. For example, the alignment and orientation may act with refractive characteristics upon the incident light. Additionally, the effect may include alteration of polarization of the light. Some embodiments may include a Variable Optic Insert wherein energization alters a focal characteristic of the lens.

In some embodiments, a dielectric material may be deposited between an Alignment Layer and an electrode. Such embodiments may include dielectric material with three-dimensional characteristics such as, for example, a preformed shape. Other embodiments may include a second layer of dielectric material wherein the first layer of dielectric material varies in thickness across the region within the Optical Zone resulting in a varying electric field across the layer of Liquid Crystal material. In alternate embodiments, the Ophthalmic Lens device may include a first layer of dielectric material that may be a composite of two materials with similar optical characteristics and dissimilar low frequency dielectric characteristics.

DETAILED DESCRIPTION OF THE INVENTION

The present invention includes methods and apparatus for manufacturing an Ophthalmic Lens with a Variable Optic Insert wherein the Variable Optic portion is comprised of a Liquid Crystal. In addition, the present invention includes an Ophthalmic Lens with a Variable Optic Insert comprised of Liquid Crystal incorporated into the Ophthalmic Lens.

According to the present invention, an Ophthalmic Lens is formed with an embedded Insert and an Energy Source, such as an electrochemical cell or battery as the storage means for the Energy. In some embodiments, the materials comprising the Energy Source may be encapsulated and isolated from an environment into which an Ophthalmic Lens is placed.

A wearer-controlled adjustment device may be used to vary the optic portion. The adjustment device may include, for example, an electronic device or passive device for increasing or decreasing a voltage output. Some embodiments may also include an automated adjustment device to change the Variable Optic portion via an automated apparatus according to a measured parameter or a wearer input. Wearer input may include, for example, a switch controlled by wireless apparatus. Wireless may include, for example, radio frequency control, magnetic switching, and inductance switching.

In some embodiments, the Insert also includes a Variable Optic portion comprised of Liquid Crystal layers. The variation in optic power may occur when electric fields, created by the energization of electrodes, causes realignment within the Liquid Crystal layer thereby shifting the molecules from the Resting Orientation to an Energized Orientation. In other alternative embodiments, different effects caused by the alteration of Liquid Crystal layers by energization of electrodes may be exploited, such as, for example, rotation of polarizing angles.

In some embodiments with Liquid Crystal layers, there may be elements in the non-optical zone portion of the Ophthalmic Lens that may be energized, whereas other embodiments may not require energization. In said embodiments without energization, the Liquid Crystal may be passively variable based on some exterior factor, such as, for example, ambient temperature, or ambient light.

A Liquid Crystal lens may provide an electrically variable index of refraction to polarized light incident upon its body. A combination of two lenses where the axis of polarization is rotated in the second lens relative to the first lens allows for a lens element that may be able to vary the index of refraction to ambient non-polarized light.

By combining electrically active Liquid Crystal layers with electrodes a physical entity may derive that may be controlled by applying an electrical field across the electrodes. If there is a dielectric layer that is present on the periphery of the Liquid Crystal layer then the field across the dielectric layer and the field across the Liquid Crystal layer may combine into the field across the electrodes. In a three dimensional shape the nature of the combination of the fields across the layers may be estimated based on electrodynamic principals and the geometry of the dielectric layer and the Liquid Crystal layer. If the effective electrical thickness of the dielectric layer is made in a non uniform manner then the effect of a field across the electrodes may be "shaped" by the effective shape of the dielectric and create dimensionally shaped changes in refractive index in the Liquid Crystal layers. In some embodiments, such shaping may result in lenses that have the ability to adopt variable focal characteristics.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Alignment Layer: as used herein refers to a layer adjacent to a Liquid Crystal layer that influences and aligns the orientation of molecules within the Liquid Crystal Layer. The resulting alignment and orientation of the molecules may affect light that passes through the Liquid Crystal layer. For example, the alignment and orientation may act with refractive characteristics upon the incident light. Additionally, the effect may include alteration of polarization of the light.

Electrical Communication: as used herein refers to being influenced by an electrical field. In the case of conductive materials, the influence may result from or in the flow of electrical current. In other materials, it may be an electrical potential field that causes an influence, such as the tendency to orient permanent and induced molecular dipoles along field lines as an example.

Energized: as used herein refers to the state of being able to supply electrical current to or to have electrical energy stored within.

Energized Orientation: as used herein refers to the orientation of the molecules of a Liquid Crystal when influenced by an effect of a potential field powered by an Energy Source. For example, a device containing Liquid Crystals may have one Energized Orientation if the Energy Source operates as either on or off. In other embodiments, the Energized Orientation may change along a scale affected by the amount of Energy applied.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Intraocular Lens: as used herein refers to an Ophthalmic Lens that is embedded within the eye.

Lens-Forming Mixture or Reactive Mixture or Reactive Monomer Mixture (RMM): as used herein refers to a monomer or prepolymer material that can be cured and crosslinked or crosslinked to form an Ophthalmic Lens. Various embodiments can include Lens-Forming Mixtures with one or more additives such as: UV blockers, tints, photoinitiators or catalysts, and other additives one might desire in an Ophthalmic Lenses such as, for example, Contact or Intraocular Lenses.

Lens-Forming Surface: as used herein refers to a surface that is used to mold a lens. In some embodiments, any such surface may have an optical quality surface finish, which indicates that it is sufficiently smooth and formed so that a lens surface fashioned by the polymerization of a Lens-Forming Mixture in contact with the molding surface is optically acceptable. Further, in some embodiments, the Lens-Forming Surface may have a geometry that is necessary to impart to the lens surface the desired optical characteristics, including, for example, spherical, aspherical and cylinder power, wave front aberration correction, and corneal topography correction.

Liquid Crystal: as used herein refers to a state of matter having properties between a conventional liquid and a solid crystal. A Liquid Crystal cannot be characterized as a solid but its molecules exhibit some degree of alignment. As used herein, a Liquid Crystal is not limited to a particular phase or structure, but a Liquid Crystal may have a specific Resting Orientation. The orientation and phases of a Liquid Crystal may be manipulated by external forces such as, for example, temperature, magnetism, or electricity, depending on the class of Liquid Crystal.

Lithium Ion Cell: as used herein refers to an electrochemical cell where Lithium ions move through the cell to generate electrical energy. This electrochemical cell, typically called a battery, may be reenergized or recharged in its typical forms.

Media Insert or Insert: as used herein refers to a formable or rigid substrate capable of supporting an Energy Source within an Ophthalmic Lens. In some embodiments, the Media Insert also includes one or more Variable Optic portions.

Mold: as used herein refers to a rigid or semi-rigid object that may be used to form lenses from uncured formulations. Some preferred Molds include two Mold parts forming a front curve Mold part and a back curve Mold part.

Ophthalmic Lens or Lens: as used herein refers to any ophthalmic device that resides in or on the eye. These devices can provide optical correction or may be cosmetic. For example, the term lens can refer to a Contact Lens, Intraocular Lens, overlay lens, ocular insert, optical insert, or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include, for example, silicone hydrogels and fluorohydrogels.

Optical Zone: as used herein refers to an area of an Ophthalmic Lens through which a wearer of the Ophthalmic Lens sees.

Power: as used herein refers to work done or energy transferred per unit of time.

Rechargeable or Reenergizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: as used herein refers to the restoration of an Energy Source to a state with higher capacity to do work. Many uses within this invention may relate to restoring a device to the capability to flow electrical current at a certain rate for a certain, reestablished time period.

Released from a Mold: as used herein refers to a lens is either completely separated from the Mold, or is only loosely attached so that it can be removed with mild agitation or pushed off with a swab.

Resting Orientation: as used herein refers to the orientation of the molecules of a Liquid Crystal device in its resting, non-energized state.

Variable Optic: as used herein refers to the capacity to change an optical quality, such as, for example, the optical power of a lens or the polarizing angle.

Ophthalmic Lenses

Figure 1:
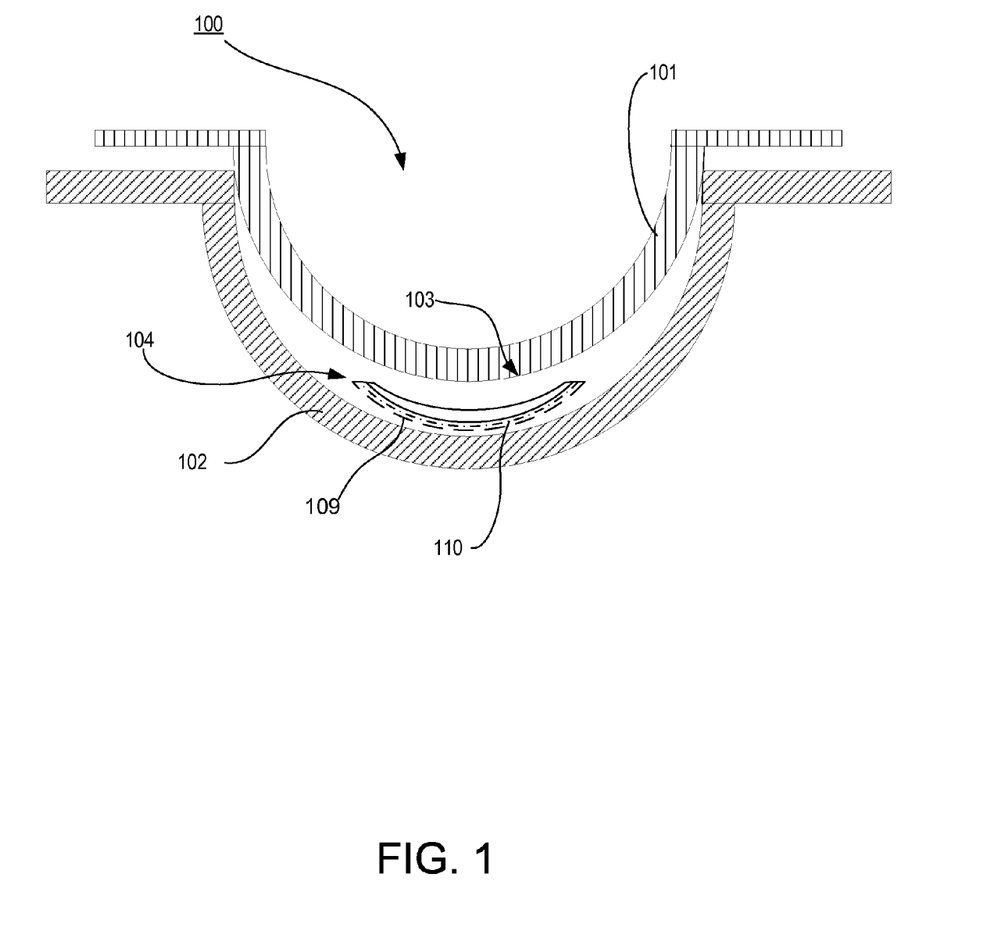
FIG. 1 illustrates exemplary Mold assembly apparatus components that may be useful in implementing some embodiments of the present invention.

Proceeding to FIG. 1, an apparatus 100 to form ophthalmic devices containing sealed and encapsulated Inserts is depicted. The apparatus includes an exemplary front curve Mold 102 and a matching back curve Mold 101. A Variable Optic Insert 104 and a body 103 of the ophthalmic device may be located inside the front curve Mold 102 and the back curve Mold 101. In some embodiments, the material of the body 103 may be a hydrogel material, and the Variable Optic Insert 104 may be surrounded on all surfaces by this material.

The Variable Optic Insert 104 may contain multiple Liquid Crystal layers 109 and 110. Other embodiments may include a single Liquid Crystal layer, some of which are discussed in later sections. The use of the apparatus 100 may create a novel ophthalmic device comprised of a combination of Components with numerous sealed regions.

In some embodiments, a lens with a Variable Optic Insert 104 may include a rigid center soft skirt design wherein a central rigid optical element including the Liquid Crystal layers 109 and 110 is in direct contact with the atmosphere and the corneal surface on respective anterior and posterior surfaces. The soft skirt of lens material (typically a hydrogel material) is attached to a periphery of the rigid optical element, and the rigid optical element also adds Energy and functionality to the resulting Ophthalmic Lens.

Figure 2:
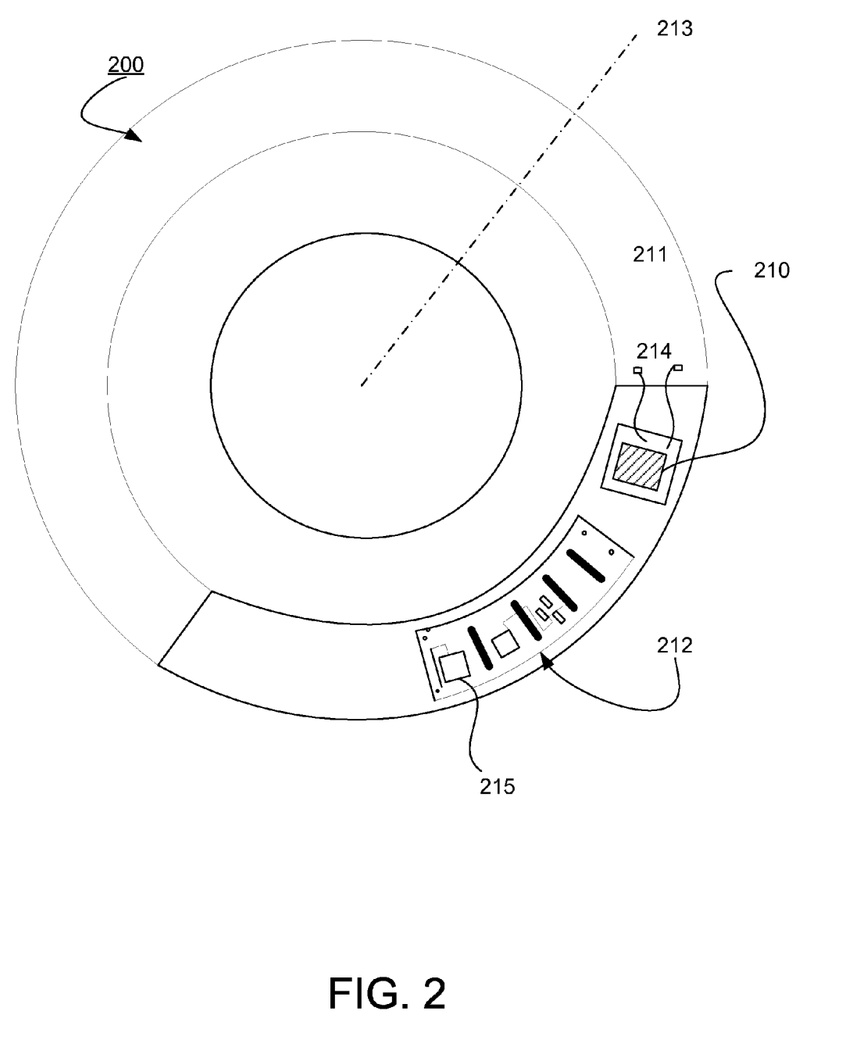
FIG. 2 illustrates an exemplary Energized Ophthalmic Lens with a Variable Optic Insert embodiment.

Referring to FIG. 2, a top down depiction of an exemplary embodiment of a Variable Optic Insert 200 is shown. In this depiction, an Energy Source 210 is shown in a periphery portion 211 of the Variable Optic Insert 200. The Energy Source 210 may include, for example, a thin film, rechargeable lithium ion battery or an alkaline cell based battery. The Energy Source 210 may be connected to contact points 214 to allow for interconnection. Wires may be wire bond wires and the wire bond wires may connect the contact points 214 to the Energy Source 210 and a photoelectric cell 215, which may be used to reenergize the Energy Source 210. Additional wires may connect the Energy Source 210 to a circuit interconnect structure of some kind via wire bonded contact. In other embodiments, an Insert may have interconnect features deposited on its surface.

In some embodiments, the Variable Optic Insert 200 may include a flexible substrate. This flexible substrate may be formed into a shape approximating a typical lens form in a similar manner previously discussed. However to add additional flexibility, the Variable Optic Insert 200 may include additional shape features such as radial cuts along its length. Various electronic components 212 such as integrated circuits, discrete components, passive components and such devices may also be included.

A Variable Optic portion 213 is also illustrated. The Variable Optic portion may be varied on command through the application of a current through the Variable Optic Insert. In some embodiments, the Variable Optic portion 213 is comprised of a thin layer of Liquid Crystal between two layers of transparent substrate.

A Variable Optic Insert Including Liquid Crystal Elements

Figure 3:
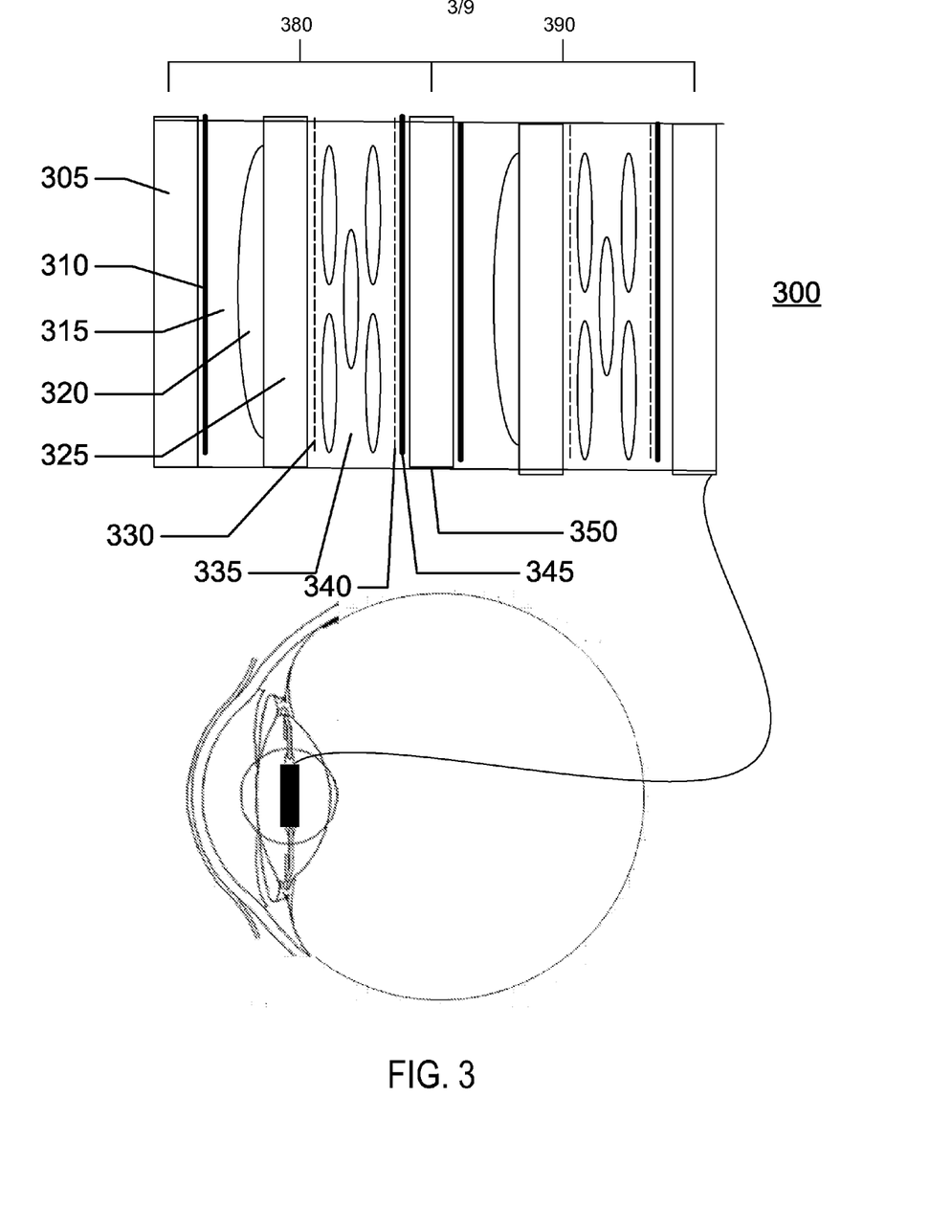
FIG. 3 illustrates a cross sectional view of an Intraocular Lens device embodiment with a Variable Optic Insert wherein the Variable Optic portion is comprised of Liquid Crystal.

Proceeding to FIG. 3, an Intraocular Lens 300 with a configuration incorporating planar layers of Liquid Crystal in combination with shaped dielectrics and transparent electrodes is demonstrated. In some embodiments, an Intraocular Lens 300 may include a first Liquid Crystal layer 335 located between two optically transparent substrate layers 305 and 345. The Liquid Crystal layer 335 may also be located between two transparent electrodes 310 and 345, which may be in Electrical Communication with an Energy Source. Upon this substrate, a transparent electrode 310 may be located. In some embodiments, the electrode 310 may be comprised of a transparent conducting oxide, such as, for example, indium tin oxide (ITO). This electrode 310 may be electrically connected to an electronic controlling element outside the Optical Zone of the lens.

Proceeding to FIG. 3, a first lens element 315 comprised of one dielectric material is observed. In some embodiments, a second lens element 320 may have different dielectric characteristics than the first lens element 315. In some embodiments, the material choice may include a combination of materials that may have a difference in dielectric constant at low frequency but may have matched characteristics in the optical spectrum. The first lens element 315 may be made from an optical glass or plastic, and the second lens element 320 may include a water-based solution, which in some embodiments has a matched index of refraction to the first lens element 315 for optical light.

Some embodiments may also include a median substrate layer 325 that may contain an Alignment Layer 330. A second Alignment Layer 340 may be located on the second optically transparent substrate 350. A second Alignment Layer 340 may be located between the Liquid Crystal 335 and the second electrode 345, which may be attached to the second substrate layer 350.

The Liquid Crystal layer 335 may be in Electrical Communication with the electrodes 310 and 345, wherein an energization by an Energy Source charges the electrodes 310 and 345, which results in the establishment of an electric field in the region between. An exemplary result of the electric field in the region of the Liquid Crystal layer may be the rotating of molecules in the layer and a resulting shift in polarizing characteristics of the layer. In another example, this shift in orientation of the molecules in the Liquid Crystal Layer 335 may cause a change in the Liquid Crystal Layer from a Resting Orientation to an Energized Orientation. In embodiments where energization is switched between two states, either activated or not activated, the Liquid Crystal layer 335 may only have a Resting Orientation and one Energized Orientation. Other alternative embodiments, where energization occurs along a scale of energy levels, the Liquid Crystal 335 may have multiple Energized Orientations.

In some embodiments, the Intraocular Lens 300 may include a second Liquid Crystal layer system 390. Said second system 390 may overlap with the first system 380 by incorporating the second substrate layer 350, though the second system 390 may still operate independently of the first layer system 380. The second layer system 390 may have the same configurations as the first layer system 380 or, in other embodiments, may have different configurations. As with the first layer system 380, the electrodes, may be in communication with a Liquid Crystal Layer. The second layer system 390 may operate in a similar manner as the first layer system 380. Alternatively, the Liquid Crystal layer 335 for the first system 380 may be comprised of a different substance than the Liquid Crystal layer of the second system 390.

Figure 4:
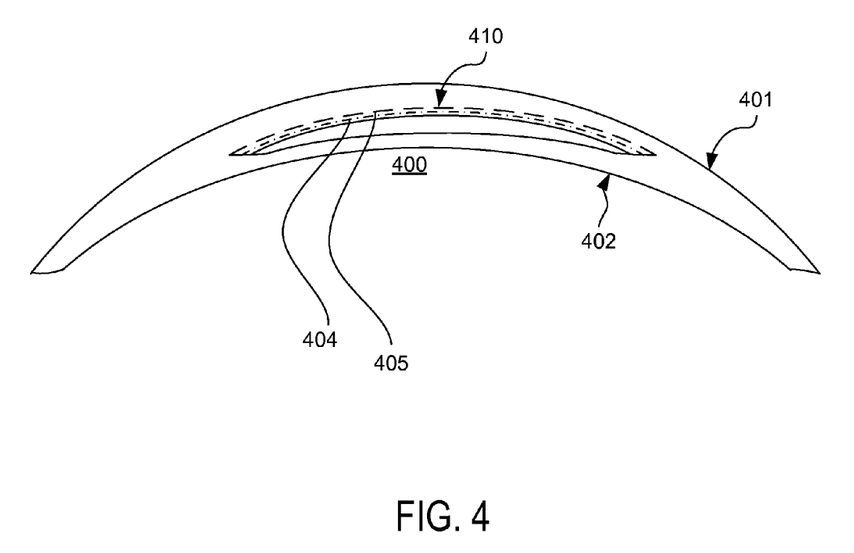
FIG. 4 illustrates a cross sectional view of an Ophthalmic Lens device embodiment with a Variable Optic Insert wherein the Variable Optic portion is comprised of Liquid Crystal

Proceeding to FIG. 4, an Ophthalmic Lens 400 is shown with an embedded Variable Optic Insert 410. The Insert 410 may have a Variable Optic portion 402 with a Liquid Crystal layer 404. Similar to the Intraocular Lens 300 of FIG. 3, the Insert 410 may have multiple Liquid Crystal layers 404 and 405. Portions of the Insert 410 may overlap with the Optical Zone of the Ophthalmic Lens 400.

Figure 5:
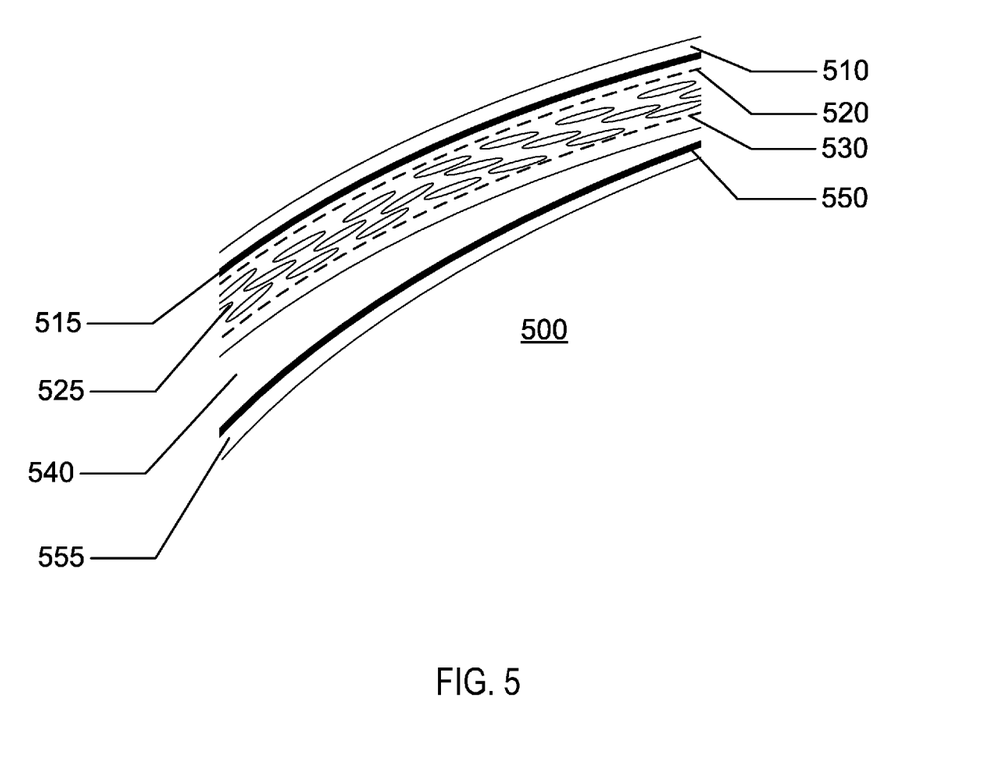
FIG. 5 illustrates an exemplary embodiment Variable Optic Insert wherein the Variable Optic portion is comprised of Liquid Crystal.

Proceeding to FIG. 5, a Variable Optic portion 500 that may be inserted into an Ophthalmic Lens is illustrated with a Liquid Crystal layer 525. The Variable Optic portion 500 may have a similar diversity of materials and structural relevance as has been discussed in other sections of this specification. In some embodiments, a transparent electrode 550 may be placed on the first transparent substrate 555. The first lens element 540 may be comprised of a dielectric film, which may be placed upon the first transparent electrode 550. In such embodiments, the shape of the dielectric layer of the first lens element 540 may form a regionally varied shape in the dielectric thickness as depicted. In some embodiments, for example, the shaped layer may be formed by injection molding upon the first transparent electrode 550 substrate 555 combination.

A Liquid Crystal layer 525 may be located between the first transparent electrode 550 and a second transparent electrode 515. The second transparent electrode 515 may be attached to the top substrate layer 510, wherein the device formed from top substrate layer 510 to the bottom substrate layer 555 may contain the Variable Optic portion 500 of the Ophthalmic Lens. Two Alignment Layers 530 and 520 may surround the Liquid Crystal layer 525. Said Alignment Layers 530 and 520 may function to define a Resting Orientation of the Ophthalmic Lens. In some embodiments, the Electrode Layers 515 and 550 may be in Electrical Communication with Liquid Crystal layer 525 and cause a shift in orientation from the Resting Orientation to at least one Energized Orientation.

Figure 6:
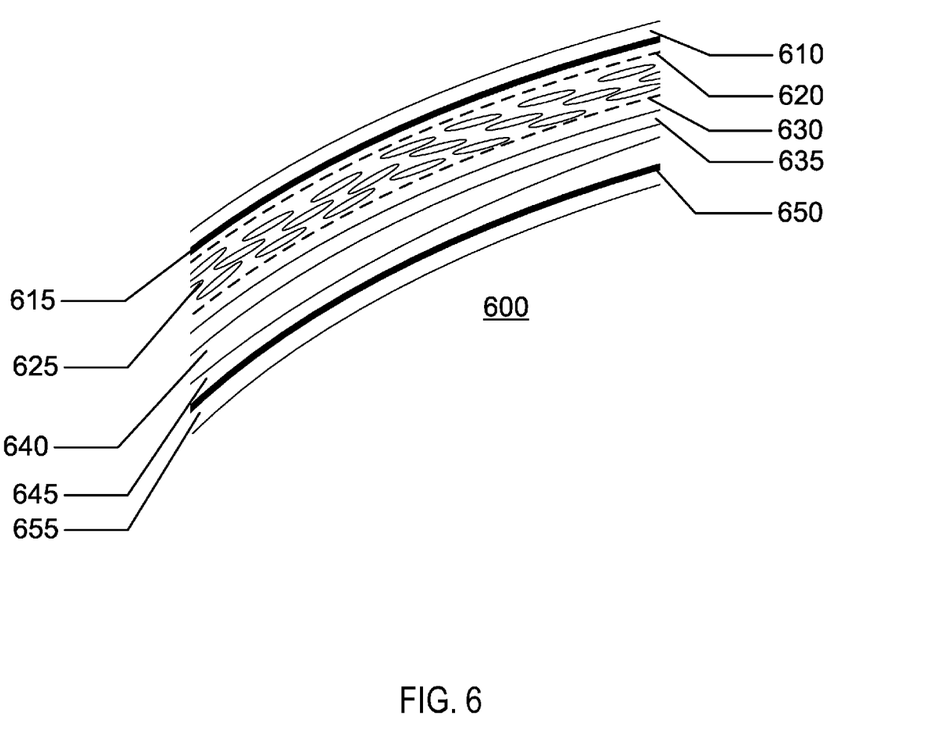
FIG. 6 illustrates an alternative embodiment of Variable Optic Insert wherein the Variable Optic portion is comprised of Liquid Crystal.

Proceeding to FIG. 6, an alternative of a Variable Optic Insert 600 that may be inserted into an Ophthalmic Lens is illustrated with a Liquid Crystal layer 625. Similar to the Variable Optic Insert 500 in FIG. 5, the layering of substrates 635 and 655 and dielectric materials on both the first lens element 645 and the second lens element 640 may result in a three-dimensional shape that may affect the optic properties of the Liquid Crystal layer 625. A first transparent electrode 650 may be located on a first substrate layer 655 of a Variable Optic portion 600 of an Ophthalmic Lens.

Since each layer 635, 655, 645, and 640 included in the Variable Optic Insert 600 has a three-dimensional property, the nature of the top substrate layer 610 and the bottom substrate layer 655 may be more complex than the similar elements 305 and 350, respectively, in the Intraocular Lens 300. In some embodiments, the shape of the top substrate layer 610 may be different from the bottom substrate layer 655. Some embodiments include a first lens element 645 and a second lens element 640 both comprised of dielectric material. The second lens element 640 may have different dielectric properties than the first lens element 645 at low frequency but may have matched aspects to the first lens element 645 in an optical spectrum. The materials of the second lens element 640 may include, for example, aqueous liquids matched to the optical properties of first lens element 645.

The Variable Optic Insert 600 may include a median substrate layer 635 that may form a surface layer upon which the Liquid Crystal layer 625 may be deposited. In some embodiments, the median substrate layer 635 may also act to contain the second lens element 640 if said second lens element 640 is in liquid form. Some embodiments may include a Liquid Crystal layer 625 locate between a first Alignment Layer 630 and a second Alignment Layer 620 wherein the second Alignment Layer 620 is placed upon a second transparent electrode 615. A top substrate layer 610 may contain the combination of layers that form the Variable Optic Insert 600, which may respond to electrical fields applied across its electrodes 650 and 615. The Alignment Layers 620 and 630 may affect the optical quality of the Variable Optic Insert 600 by various means, including, for example, the means described for FIGS. 3 and 12.

Materials

Microinjection molding embodiments can include, for example, a poly(4-methylpent-1-ene) copolymer resin are used to form lenses with a diameter of between about 6 mm to 10 mm and a front surface radius of between about 6 mm and 10 mm and a rear surface radius of between about 6 mm and 10 mm and a center thickness of between about 0.050 mm and 1.0 mm. Some exemplary embodiments include an Insert with diameter of about 8.9 mm and a front surface radius of about 7.9 mm and a rear surface radius of about 7.8 mm and a center thickness of about 0.200 mm and an edge profile of about 0.050 radius.

The Variable Optic Insert 104 can be placed in a Mold part 101 and 102 utilized to form an Ophthalmic Lens. Mold part 101 and 102 material can include, for example: a polyolefin of one or more of: polypropylene, polystyrene, polyethylene, polymethyl methacrylate, and modified polyolefins. Other Molds can include a ceramic or metallic material.

A preferred alicyclic co-polymer contains two different alicyclic polymers. Various grades of alicyclic co-polymers may have glass transition temperatures ranging from 105° C. to 160° C.

In some embodiments, the Molds of the invention may contain polymers such as polypropylene, polyethylene, polystyrene, polymethyl methacrylate, modified polyolefins containing an alicyclic moiety in the main chain and cyclic polyolefins. This blend can be used on either or both Mold halves, where it is preferred that this blend is used on the back curve and the front curve consists of the alicyclic co-polymers.

In some preferred methods of making Molds 100 according to the present invention, injection molding is utilized according to known techniques, however, embodiments can also include Molds fashioned by other techniques including, for example: lathing, diamond turning, or laser cutting.

Typically, lenses are formed on at least one surface of both Mold parts 101 and 102. However, in some embodiments, one surface of a lens may be formed from a Mold part 101 or 102 and another surface of a lens can be formed using a lathing method, or other methods.

In some embodiments, a preferred lens material includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

In some embodiments, the Ophthalmic Lens skirt, also called an Insert-encapsulating layer, that surrounds the Insert may be comprised of standard hydrogel Ophthalmic Lens formulations. Exemplary materials with characteristics that may provide an acceptable match to numerous Insert materials may include, but are not limited to, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated Inserts and should be considered consistent and included within the scope of the claims.

Suitable silicone containing components include compounds of Formula I where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment, b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment, b is 5 to 400 or from 10 to 300, both terminal $R^1$ comprise monovalent reactive groups and the remaining $R^1$ are independently selected from monovalent alkyl groups having 1 to 18 carbon atoms, which may have ether linkages between carbon atoms and may further comprise halogen.

In one embodiment, where a silicone hydrogel lens is desired, the lens of the present invention will be made from a Reactive Mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

$$H_2C=\underset{R}{C}-(CH_2)_q-O-\underset{\parallel}{\overset{O}{C}}-Y \qquad \text{Formula II}$$

wherein: Y denotes —O—, —S— or —NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio) propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and $$H_2C=\underset{H}{\overset{O}{\underset{\parallel}{C}}}-OCO(CH_3)_4-\underset{CH_3}{\overset{CH_3}{\underset{|}{Si}}}-O-\left[\underset{CH_3}{\overset{CH_3}{\underset{|}{Si}}}-O\right]_{25}\underset{CH_3}{\overset{CH_3}{\underset{|}{Si}}}-(CH_2)_4O\overset{O}{\underset{\parallel}{C}}O-\underset{H}{C}=CH_2$$

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

$(*D*A*D*G)_a*D*D*E^1$;

$E(*D*G*D*A)_a*D*G*D*E^1$ or;

$E(*D*A*D*G)_a*D*A*D*E^1$ \qquad Formulae IV-VI wherein:
D denotes an alkyl diradical, an alkyl cycloalkyl diradical, a cycloalkyl diradical, an aryl diradical or an alkylaryl diradical having 6 to 30 carbon atoms,
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
\* denotes a urethane or ureido linkage;
$a$ is at least 1;
A denotes a divalent polymeric radical of formula:
Formula VII $$-(CH_2)_y-\left[\underset{R^{11}}{\overset{R^{11}}{\underset{|}{\overset{|}{Si}O}}}\right]_p\underset{R^{11}}{\overset{R^{11}}{\underset{|}{\overset{|}{Si}}}}-(CH_2)_y-$$

$R^{11}$ independently denotes an alkyl or fluoro-substituted alkyl group having 1 to 10 carbon atoms, which may contain ether linkages between carbon atoms; y is at least 1; and p provides a moiety weight of 400 to 10,000; each of E and $E^1$ independently denotes a polymerizable unsaturated organic radical represented by formula:

$$R^{13}CH=\underset{R^{12}}{\overset{|}{C}}-(CH_2)_w-(X)_x-(Z)_z-(Ar)_y-R^{14}- \qquad \text{Formula VIII}$$

wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

Formula IX $$CH_2=\underset{CH_3}{\overset{CH_3}{\underset{|}{C}}}-\overset{O}{\underset{\parallel}{C}}OCH_2CH_2-\left[-O\overset{O}{\underset{\parallel}{C}}N-R^{16}-N\overset{O}{\underset{\parallel}{C}}OCH_2CH_2OCH_2CH_2O\overset{O}{\underset{\parallel}{C}}N-R^{16}-N\overset{O}{\underset{\parallel}{C}}O(CH_2)_m-\left(\underset{CH_3}{\overset{CH_3}{\underset{|}{Si}O}}\right)_p\underset{CH_3}{\overset{CH_3}{\underset{|}{Si}}}-(CH_2)_m-O\overset{O}{\underset{\parallel}{C}}N-R^{16}-\right]_a$$

$$-N\overset{O}{\underset{\parallel}{C}}OCH_2CH_2OCH_2CH_2O\overset{O}{\underset{\parallel}{C}}N-R^{16}-N\overset{O}{\underset{\parallel}{C}}O-CH_2CH_2CO\underset{CH_3}{\overset{CH_3}{\underset{|}{O}C}}=CH_2$$

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component in this invention.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention. It may be obvious to one skilled in the art that additional embodiments may be practical, and such methods are well within the scope of the claims.

Figure 7:
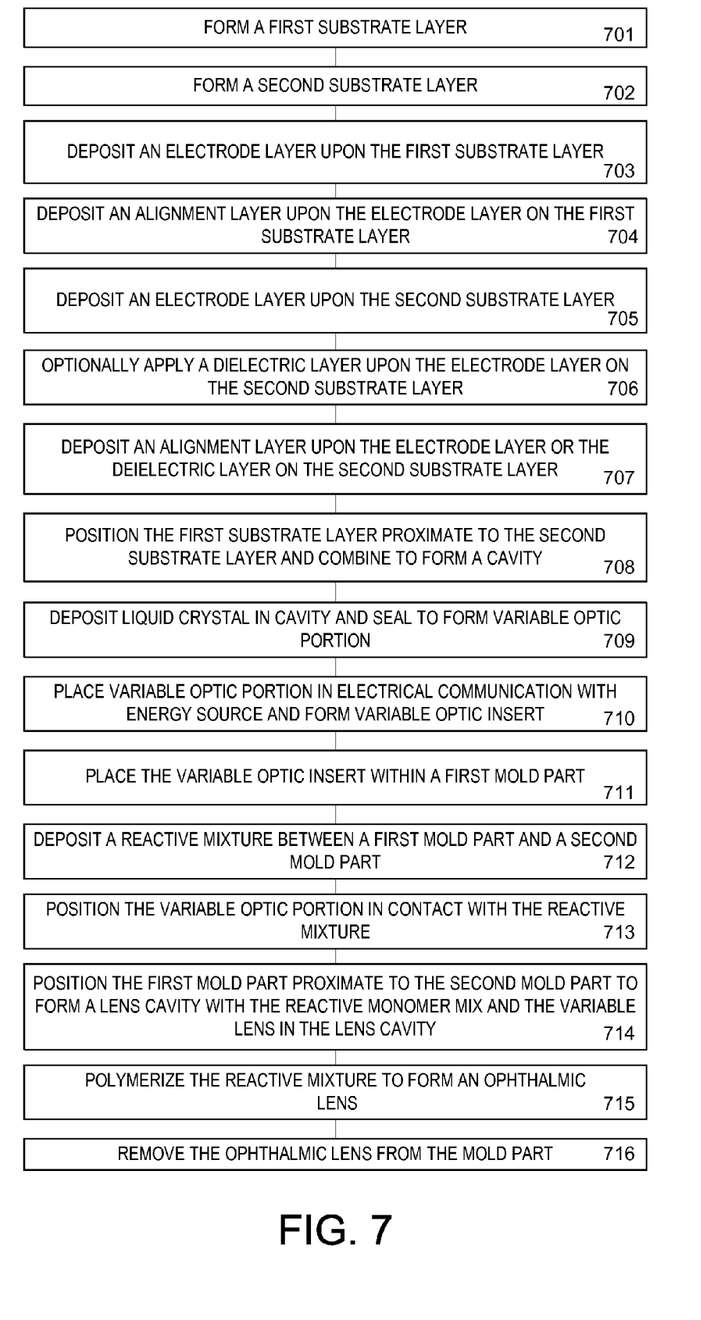
FIG. 7 illustrates method steps for forming an Ophthalmic Lens with a Variable Optic Insert comprised of Liquid Crystal.

Proceeding to FIG. 7, a flowchart illustrates exemplary steps that may be used to implement the present invention. At 701, form a first substrate layer, and, at 702, form a second substrate layer. At 703, an electrode layer may be deposited upon the first substrate layer. The deposition may occur, for example, by vapor deposition or electroplating. In some embodiments, the first substrate layer may be part of an Insert that has regions both in the Optical Zone and regions in the non-optic zone. The electrode deposition process may simultaneously define interconnect features in some embodiments.

At 704, the first substrate layer may be further processed to add an Alignment Layer upon the previously deposited electrode layer. The Alignment Layers may be deposited upon the top layer on the substrate and then processed in standard manners, such as, for example, rubbing techniques, to create the grooving features that are characteristic of standard Alignment Layers.

At 705, the second substrate layer may be further processed. An electrode layer may be deposited upon the second substrate layer in an analogous fashion to step 703. Then in some embodiments, at 706, a dielectric layer may be applied upon the second substrate layer upon the electrode layer. The dielectric layer may be formed to have a variable thickness across its surface. As an example, the dielectric layer may be molded upon the first substrate layer. Alternatively, a previously formed dielectric layer may be adhered upon the electrode surface of the second substrate piece.

At 707, an Alignment Layer may be formed upon the second substrate layer in similar fashion to the processing step at 704. After 707, two separate substrate layers that may form at least a portion of an Ophthalmic Lens Insert may be ready to be joined. In some embodiments at 708, the two pieces will be brought in close proximity to each other and then Liquid Crystal material may be filled in between the pieces. At 709, the two pieces may be brought adjacent to each other and then sealed to form a Variable Optic element with Liquid Crystal.

In some embodiments, two pieces of the type formed at 709 may be created by repeating method steps 701 to 709 wherein the Alignment Layers are offset from each other to allow for a Lens that may adjust the focal power of non-polarized light. In such embodiments, the two Variable Optic layers may be combined to form a single Variable Optic Insert. At 710, the Variable Optic portion may be connected to the Energy Source and intermediate or attached components may be placed thereon.

At 711, the Variable Optic Insert resulting at step 710 may be placed within a Mold part. The Variable Optic Insert may or may not also contain one or more components. In some preferred embodiments, the Variable Optic Insert is placed in the Mold part via mechanical placement. Mechanical placement can include, for example, a robot or other automation, such as that known in the industry to place surface mount components. Human placement of a Variable Optic Insert is also within the scope of the present invention. Accordingly, any mechanical placement or automation may be utilized which is effective to place a Variable Optic Insert with an Energy Source within a cast Mold part such that the polymerization of a Reactive Mixture contained by the Mold part will include the Variable Optic in a resultant Ophthalmic Lens.

In some embodiments, a Variable Optic Insert is placed in a Mold part attached to a substrate. An Energy Source and one or more components are also attached to the substrate and are in Electrical Communication with the Variable Optic Insert. Components may include for example, circuitry to control power applied to the Variable Optic Insert. Accordingly, in some embodiments a component includes control mechanism for actuating the Variable Optic Insert to change one or more optical characteristics, such as, for example, a change of state between a first optical power and a second optical power.

In some embodiments, a processor device, MEMS, NEMS or other component may also be placed into the Variable Optic Insert and in electrical contact with the Energy Source. At 712, a Reactive Monomer Mixture may be deposited into a Mold part. At 713, the first Mold part is placed proximate to a second Mold part to form a lens-forming cavity with at least some of the Reactive Monomer Mixture and the Variable Optic Insert in the cavity. As discussed above, preferred embodiments include an Energy Source and one or more components also within the cavity and in Electrical Communication with the Variable Optic Insert.

At 714, the Reactive Monomer Mixture within the cavity is polymerized. Polymerization may be accomplished, for example, via exposure to one or both of actinic radiation and heat. At 715, the Ophthalmic Lens is removed from the Mold parts with the Variable Optic Insert adhered to or encapsulated within the Insert-encapsulating polymerized material making up the Ophthalmic Lens.

Although invention may be used to provide hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Apparatus

Figure 8:
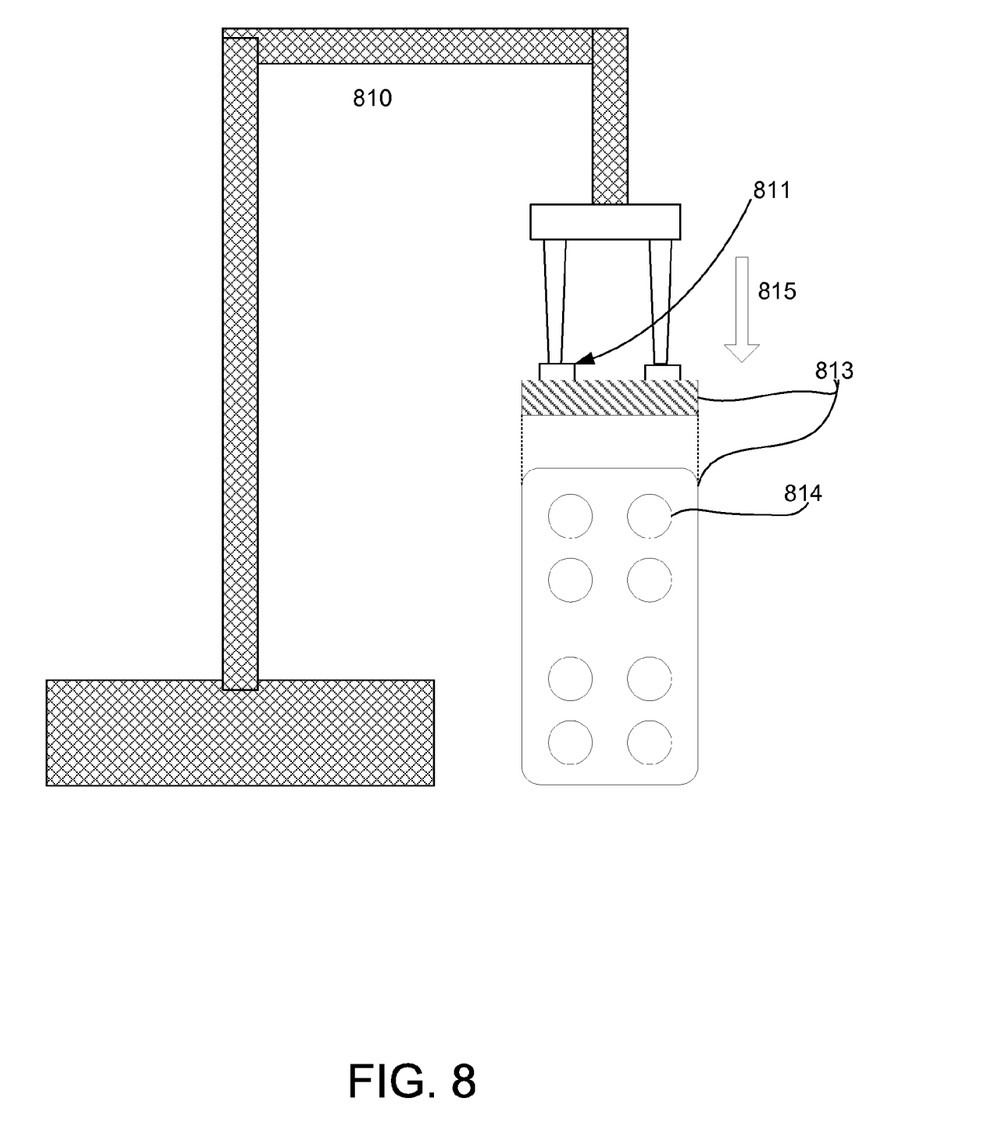
FIG. 8 illustrates an example of apparatus components for placing a Variable Optic Insert comprised of Liquid Crystal into an Ophthalmic Lens Mold part.

Referring now to FIG. 8, automated apparatus 810 is illustrated with one or more transfer interfaces 811. Multiple Mold parts, each with an associated Variable Optic Insert 814 are contained on a pallet 813 and presented to transfer interfaces 811. Embodiments, can include, for example a single interface individually placing Variable Optic Insert 814, or multiple interfaces (not shown) simultaneously placing Variable Optic Inserts 814 into the multiple Mold parts, and in some embodiments, in each Mold part. Placement may occur via vertical movement 815 of the transfer interfaces 811.

Another aspect of some embodiments of the present invention, includes apparatus to support the Variable Optic Insert 814 while the body of the Ophthalmic Lens is molded around these components. In some embodiments the Variable Optic Insert 814 and an Energy Source may affixed to holding points in a lens Mold (not illustrated). The holding points may be affixed with polymerized material of the same type that will be formed into the lens body. Other embodiments include a layer of prepolymer within the Mold part onto which the Variable Optic Insert 814 and an Energy Source may be affixed.

Processors Included in Insert Devices

Figure 9:
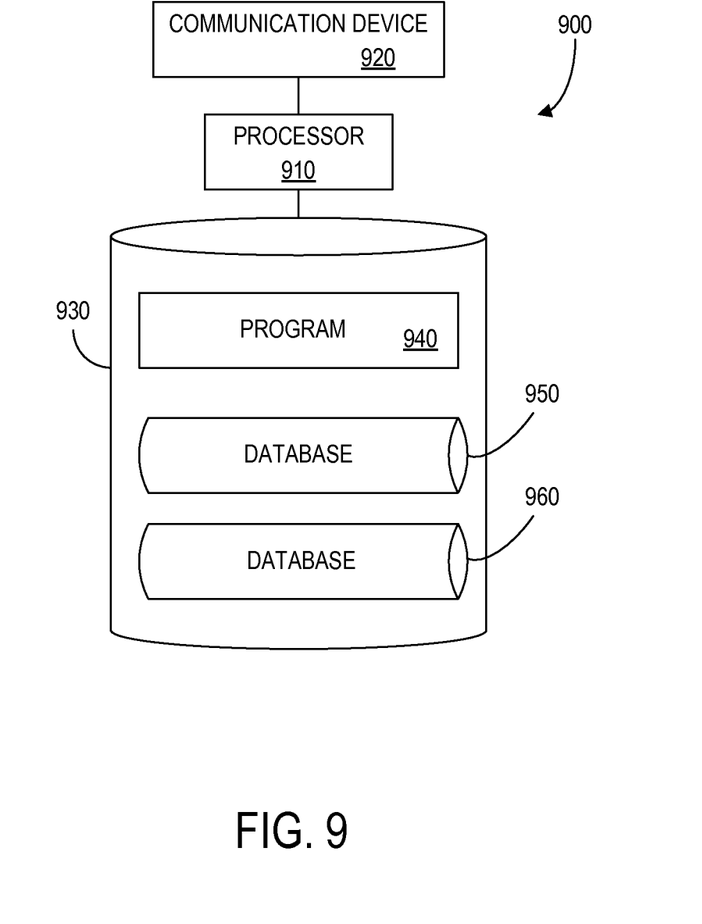
FIG. 9 illustrates a processor that may be used to implement some embodiments of the present invention.

Referring now to FIG. 9, a controller 900 is illustrated that may be used in some embodiments of the present invention. The controller 900 includes a processor 910, which may include one or more processor components coupled to a communication device 920. In some embodiments, a controller 900 may be used to transmit energy to the Energy Source placed in the Ophthalmic Lens.

The controller can include one or more processors, coupled to a communication device configured to communicate energy via a communication channel. The communication device may be used to electronically control one or more of the placement of an Variable Optic Insert into the Ophthalmic Lens or the transfer of a command to operate a Variable Optic device.

The communication device 920 may also be used to communicate, for example, with one or more controller apparatus or manufacturing equipment components.

The processor 910 is also in communication with a storage device 930. The storage device 930 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 930 can store a program 940 for controlling the processor 910. The processor 910 performs instructions of the program 940, and thereby operates in accordance with the present invention. For example, the processor 910 may receive information descriptive of Variable Optic Insert placement, processing device placement, and the like. The storage device 930 can also store ophthalmic related data in one or more databases 950, 960. The database 950 and 960 may include specific control logic for controlling energy to and from a Variable Optic lens.

The invention claimed is:

1. An energized ophthalmic lens device with a variable optic insert comprising:
   an ophthalmic lens insert-encapsulating layer comprising an optical zone and a non-optical zone;
   a variable optic insert comprising at least a portion within the optical zone;
   an energy source embedded in the ophthalmic lens insert-encapsulating layer in at least a region comprising the non-optical zone;
   the variable optic insert comprising a layer of liquid crystal material; and
   at least a first layer of dielectric material proximate to the layer of liquid crystal material,
   wherein the first layer of dielectric material varies in thickness across a region within the optical zone.

2. The energized ophthalmic lens device of claim 1 wherein:
   the energized ophthalmic lens is a contact lens.

3. The energized ophthalmic lens device of claim 2 wherein:
   a varying electric field across the layer of liquid crystal material results from at least the first layer of dielectric material varying in thickness across the region within the optical zone.

4. The energized ophthalmic lens device of claim 3 wherein:
   the variable optic insert alters a focal characteristic of the energized ophthalmic lens.

5. The energized ophthalmic lens device of claim 3 wherein:
the first layer of dielectric material is a composite of two materials with similar optical characteristics and dissimilar low frequency dielectric characteristics.

6. The energized ophthalmic lens device of claim 2 wherein:
the energy source energizes components within the energized ophthalmic lens and causes the layer of liquid crystal material to alter its polarizing effect on light.

7. The energized ophthalmic lens device of claim 3 wherein:
the layer of liquid crystal material is between at least two alignment layers;
the at least two alignment layers are between at least two electrode layers;
and the at least two electrode layers are in electrical communication with the energy source.

8. The energized ophthalmic lens device of claim 7 wherein:
the layer of liquid crystal material has at least a first energized orientation; and
an energization of the at least two electrode layers causes the layer of liquid crystal material to shift from a resting orientation to at least the first energization orientation.

9. The energized ophthalmic lens device of claim 1 wherein:
the ophthalmic lens insert-encapsulating layer comprises a silicone-containing material.

10. The energized ophthalmic lens device of claim 1 wherein:
the ophthalmic lens insert-encapsulating layer comprises Etafilcon A.

11. The energized ophthalmic lens device of claim 1 additionally comprising:
a processor.

12. The energized ophthalmic lens device of claim 7 additionally comprising:
a processor.

13. The energized ophthalmic lens device of claim 7 wherein:
the energy source comprises a scale of energy levels;
the layer of liquid crystal material comprises a plurality of energization orientations, wherein each of the plurality of energization orientations relates to a different one of the scale of energy levels; and
an energization of the at least two electrode layers at a particular one of the scale of energy levels causes the layer of liquid crystal material to shift from a resting orientation to the related one of the plurality of energization orientations.

14. An energized intraocular lens with a variable optic insert comprising:
an intraocular lens with an optical zone and a first non-optical zone;
an energy source attached to the intraocular lens in the first non-optical zone;
a variable optic insert comprising at least a first layer of liquid crystal material; and
at least a first layer of dielectric material proximate to the layer of liquid crystal material,
wherein the first layer of dielectric material is shaped to have a different thickness across the optical zone.

15. The energized intraocular lens of claim 14 wherein:
the first layer of dielectric material is a composite of at least a first material and a second material with similar optical characteristics and dissimilar low frequency dielectric characteristics.

16. The energized intraocular lens of claim 15 wherein:
the variable optic insert alters a focal characteristic of the intraocular lens.

17. The energized intraocular lens of claim 16 wherein:
the energy source energizes components within the intraocular lens and causes the layer of liquid crystal material to alter its refractive effect on light.

18. The energized intraocular lens of claim 17 wherein:
at least the first layer of liquid crystal material is between at least two electrode layers; and
the at least two electrode layers are in electrical communication with the energy source.

19. The energized intraocular lens of claim 18 wherein:
at least the first layer of liquid crystal material has at least a first energized orientation; and
an energization of the at least two electrode layers causes the layer of liquid crystal material to shift from a resting orientation to at least the first energized orientation.

20. The energized intraocular lens device of claim 18 additionally comprising:
a processor.

21. The energized intraocular lens device of claim 18 wherein:
the energy source comprises a scale of energy levels;
the layer of liquid crystal material comprises a plurality of energization orientations, wherein each of the plurality of energization orientations relates to a different one of the scale of energy levels; and
an energization of the at least two electrode layers at a particular one of the scale of energy levels causes the layer of liquid crystal material to shift from a resting orientation to the related one of the plurality of energization orientations.

* * * * *